United States Patent
Tran et al.

(10) Patent No.: US 11,115,910 B2
(45) Date of Patent: Sep. 7, 2021

(54) ENHANCED RADIO FREQUENCY BAND SCANNING

(71) Applicant: T-Mobile USA, Inc., Bellevue, WA (US)

(72) Inventors: Gina Tran, Seattle, WA (US); Wafik Abdel Shahid, Kenmore, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 108 days.

(21) Appl. No.: 16/531,599

(22) Filed: Aug. 5, 2019

(65) Prior Publication Data
US 2021/0045044 A1 Feb. 11, 2021

(51) Int. Cl.
H04W 48/16 (2009.01)
H04W 24/08 (2009.01)

(52) U.S. Cl.
CPC .......... *H04W 48/16* (2013.01); *H04W 24/08* (2013.01)

(58) Field of Classification Search
None
See application file for complete search history.

(56) References Cited

U.S. PATENT DOCUMENTS

| | | | | |
|---|---|---|---|---|
| 9,125,146 B1* | 9/2015 | Edara | ................... | H04W 48/16 |
| 2006/0262739 A1* | 11/2006 | Ramirez | ............... | H04W 88/06 |
| | | | | 370/311 |
| 2010/0167729 A1* | 7/2010 | Kim | ..................... | H04W 48/16 |
| | | | | 455/434 |
| 2011/0165892 A1* | 7/2011 | Ristich | .................. | H04W 64/00 |
| | | | | 455/456.2 |
| 2012/0264425 A1 | 10/2012 | Krishnamoorthy et al. | | |
| 2013/0029606 A1* | 1/2013 | Wang | .................. | H04W 52/367 |
| | | | | 455/62 |
| 2013/0285855 A1* | 10/2013 | Dupray | ................. | G01S 5/0278 |
| | | | | 342/451 |
| 2014/0161165 A1* | 6/2014 | Hiscock | ............. | H04L 27/2601 |
| | | | | 375/224 |
| 2015/0351013 A1 | 12/2015 | Zhang et al. | | |
| 2018/0077612 A1* | 3/2018 | Zheng | ................... | H04W 76/27 |
| 2018/0160271 A1 | 6/2018 | Vutukuri et al. | | |
| 2019/0215729 A1* | 7/2019 | Oyman | ................... | H04L 65/80 |

OTHER PUBLICATIONS

European Patent Application No. 20186592.0, European Search Report dated Sep. 3, 2020, 12 pages.

* cited by examiner

*Primary Examiner* — Edan Orgad
*Assistant Examiner* — Emmanuel K Maglo
(74) *Attorney, Agent, or Firm* — Han Santos, PLLC (57) ABSTRACT

Techniques are described herein for optimizing band scanning for one or more bands supported by a mobile device for connection to a wireless network. The techniques include determining geolocation coordinates corresponding to a real-time location of a mobile device. The mobile device may identify at least one available radio frequency (RF) band supported by the mobile device based at least on the geolocation coordinates. In some aspects, the mobile device may determine whether a signal quality of the available RF band is above a predetermined threshold. If the signal quality of the available RF band is above the predetermined threshold, the mobile device may selectively prioritize a scan for support by a wireless network of the available RF band and connect to the wireless network using the available RF band.

20 Claims, 5 Drawing Sheets

ENHANCED RADIO FREQUENCY BAND SCANNING

BACKGROUND

Mobile devices can support several radio frequency (RF) bands for various radio technologies, and wireless networks typically support more than one RF band, which refer to a defined range of frequencies or wavelengths in an electromagnetic spectrum. To connect to a wireless network over a detected band, the mobile device can utilize a list hardcoded onto the mobile device that it then scans through when the mobile device is powered on, moved back into a coverage area, or when toggled off from an airplane mode. With the proliferation of radio frequencies that telecommunications service providers own and operate on, in addition to roaming agreements with other telecommunications service providers, scanning through all the available bands that the mobile device supports can take a prolonged period of time, resulting in a poor user experience.

BRIEF DESCRIPTION OF THE DRAWINGS

The detailed description is described with reference to the accompanying figures, in which the leftmost digit(s) of a reference number identifies the figure in which the reference number first appears. The use of the same reference numbers in different figures indicates similar or identical items.

DETAILED DESCRIPTION

This disclosure is directed to techniques for optimizing band scanning at a mobile device. When a mobile device is powered on, its first task from a radio point of view is to search for a suitable network and then attempt to register. To speed up the task, the mobile device is guided by information on the Universal Integrated Circuit Card (UICC) (e.g., Subscriber Identity Module (SIM) card) stored in the home network with an access technology field. With this field, the network operator can instruct the mobile device for which radio access technology (e.g., Global System for Mobile Communications (GSM), Universal Mobile Telecommunication System (UMTS), Long-Term Evolution (LTE)) to search first and then use for registration. To shorten the search process, the mobile device stores the parameters of the last network cell it used before it was switched off, whereby the network cell can include a microcell, a femtocell, and/or a picocell. After the device is powered on (or toggled off from an airplane mode), it can go to the last known band and use the last known cell parameters to see if the network cell can still be found. This can increase the speed of the cell search procedure if the mobile device has not been carried to another place while it was switched off and the last used radio access technology is the same as the network operator preference stored on the UICC.

In the case where the previous network cell is not found with the stored information, the mobile device performs a full search. During the first step of the LTE cell search mechanism, the mobile device searches on all channels in all supported frequency bands for an initial signal and tries to pick up a Primary Synchronization Signal (PSS). Once found, the device remains on the channel and locates the Secondary Synchronization Signal (SSS). While the content of the PSS is always the same, the content of the SSS is alternated in every frame so that the mobile device can detect from the pattern as to where to find the beginning of the frame.

To make the network cell detection easier, the network cell may broadcast PSS and SSS only on a predetermined frequency of the channel, such as the inner 1.25 MHz of the channel, irrespective of the total channel bandwidth. This way, a simpler Fast Fourier Transformation (FFT) analysis can be performed to detect the signals. Also, the initial cell search is not dependent on the channel bandwidth. The PSSs and SSSs implicitly contain the Physical Cell Identity (PCI), which distinguishes neighboring network cells transmitting on the same frequency. Mobile devices receive several PSS and SSS and can, therefore, detect several PCIs on the same frequency. After detection of the PSS and SSS, the mobile device is also aware if the network cell uses a normal or an extended cyclic prefix. The signals transmitted from the different network cells on the same channel interfere with each other.

As a channel is used only by one operator (except at national borders), the mobile device would attempt to start communication only with the network cell with the strongest synchronization signals and ignore the other network cells on the same frequency. In the case where the mobile device has found the network cell it used before it was switched off, it may go directly to the last used network cell and stop searching for other network cells on different channels in the current frequency band, even if the network cell is not the strongest on the current channel. After a successful attach procedure, the cell reselection mechanism or a handover can ensure that the mobile device is served by the strongest network cell it receives.

The next step in the cell search procedure is to read the system information (SI) messages of the Master Information Block (MIB) from the Physical Broadcast Channel (PBCH). The MIB contains information about the configuration of the channel for initial access, such as the total bandwidth used for the channel, the structure of the Hybrid Automatic Retransmission Request (HARM) indicator channel, and the System Frame Number (SFN). With the information from the MIB, the mobile device can then begin to search for the System Information Block 1 (SIB-1). Once found, the SIB-1 message contains the cell identity and access-related parameters, the Mobile Country Code (MCC) and Mobile Network Code (MNC) of the network cell, the Nonaccess Stratum (NAS) cell identifier, the Tracking Area Code (TAC), cell barring status, minimum reception level that the mobile device must receive the network cell with, and a scheduling list of other SIBs that are sent and their intervals.

With the information provided in SIB-1, the mobile device can decide if it wants to start communicating with this network cell. If so, for example, since the network cell belongs to the home network, the mobile device then continues to search and decode further SI messages. SIB-2 contains further parameters that are required to communicate with a network cell, such as the configuration of the Random Access Channel (RACH), the paging channel configuration, the downlink shared channel configuration, the Physical Uplink Control Channel (PUCCH) configuration, the Sounding References Signal (SRS) configuration in the uplink, uplink power control information; timers and constants, and uplink channel bandwidth. Further SIBs contain information that is mainly relevant for cell reselection once the mobile device has established a connection with the network. If the network cell is not part of the home network or does not belong to the last used network stored on the mobile device (e.g., during international roaming), the mobile device then goes on and searches other channels on the current frequency band and also on other RF bands.

Example embodiments relate to techniques for a mobile device to optimize band scanning by identifying and selectively prioritizing at least one preferred RF band of a wireless network to scan from a plurality of bands supported by the mobile device when the mobile device is powered on, moves back into a coverage area, or when toggled off from an airplane mode. For example, the mobile device may enter the coverage area of a first RF band of a wireless network and connect to the wireless network using the first RF band. Subsequently, the mobile device may be powered off and carried to a different location. Upon powering back on, the mobile device may attempt to re-establish a connection to a last acquired network cell of the wireless network using the first RF band (i.e., the last used RF band). If the mobile device is unable to establish the connection via the first RF band, the mobile device determines the geolocation coordinates (i.e., longitude and latitude) of its location using location services to identify one or more available RF bands.

Upon identifying one or more available RF bands, the mobile device determines whether the signal quality of an available RF band exceeds a predetermined threshold. If the signal quality of the available RF band is above the predetermined threshold, the available RF band is preferred over other bands that the mobile device supports. Accordingly, the mobile device may scan the wireless network to determine if the preferred RF band is supported before other bands are scanned. Subsequently, the mobile device may perform multiple scans if the available RF band is not supported. In some aspects, more than one available band may provide an acceptable signal quality. In this case, the aggregate bandwidths of the available bands are compared to select the band with the most bandwidth. Multiple scans may be performed, depending upon embodiments. The techniques described herein may be implemented in a number of ways. Example implementations are provided below with reference to the following figures.

Example Network Architecture

Figure 1:
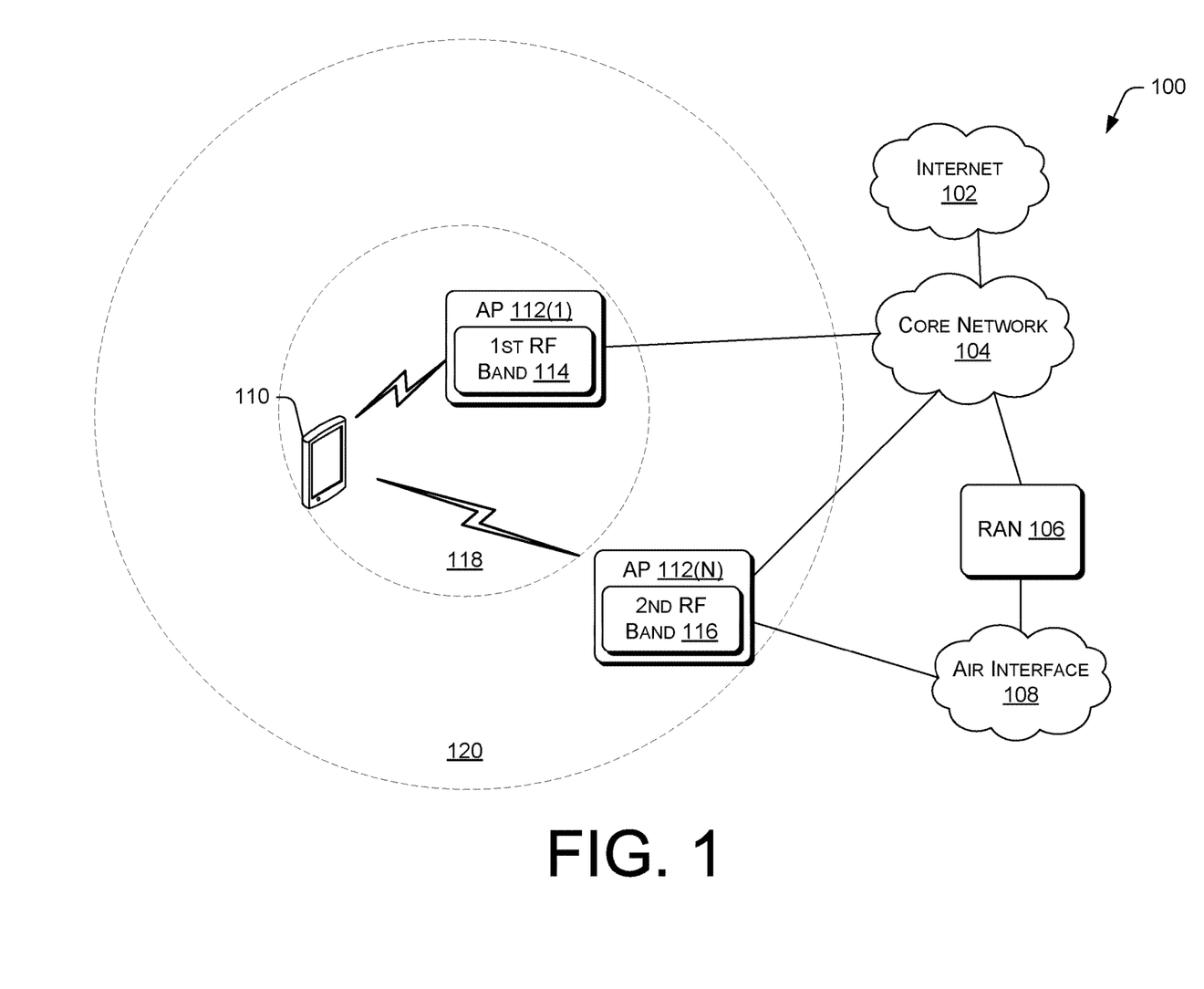
FIG. 1 illustrates example network architecture for scanning for a preferred band of a plurality of bands supported by a mobile device based at least on geolocation coordinates of the location of the mobile device.

FIG. 1 illustrates example architecture for scanning for a preferred band of a plurality of bands supported by a mobile device based at least on geolocation coordinates of the location of the mobile device and signal quality. The architecture may include a mobile device 110 in a wireless communication network 100. The mobile device 110 can include smartphones, personal digital assistants (PDAs), handheld devices, tablet computers, laptops, display devices (e.g., TVs, computer monitors), printers, general computers, or other user equipment having a wireless communication function that is capable of receiving input, processing the input, and generating output data. While only one mobile device 110 is illustrated, the architecture may include multiple mobile devices.

The mobile device 110 can communicate with an access network (e.g., a radio access network (RAN), an access point (AP), etc.) over a physical communications interface or network access technologies. For example, the air interface 108 may serve the mobile device 110 over a local wireless connection. The air interface 108 can comply with a given cellular communications protocol. For example, the network can implement 2G, 3G, 4G, 5G, LTE, LTE advanced, high-speed data packet access (HSDPA), evolved high-speed packet access (HSPA+), UMTS, code-division multiple access (CDMA), GSM, a local area network (LAN), a wide area network (WAN), and/or a collection of networks (e.g., the Internet). The air interface 108 can also comply with a wireless IP protocol (e.g., Wi-Fi, IEEE 802.11).

The RAN 106 can include a plurality of APs 112(1)-112(N) that serve the mobile device 110 over air interface 108. The Aps 112(1)-112(N) can serve a respective coverage cell (e.g., microcell, femtocell, picocell, etc.). In one aspect, an AP in the RAN 106 can be referred to as an access node (AN), a base station, Node B, evolved Node B (eNode B), and/or so forth. An AP can alternatively be a terrestrial access point or a satellite access point. The RAN 106 connects to a core network 104 that can perform a variety of functions, including bridging circuit switched calls between mobile devices served by the RAN 106 and other mobile devices served by the RAN 106 or a different RAN. The RAN 106 can also mediate an exchange of packet-switched (PS) data with external networks such as the Internet 102. The Internet 102 can include a number of routing agents and processing agents (not shown).

The core network 104 can provide one or more communications services (e.g., voice-over-Internet Protocol (VoIP) sessions, push-to-talk (PTT) sessions, group communication sessions, etc.) for mobile device 110. The mobile device 110 can connect to the core network 104 via the RAN 106 and/or the Internet 102. Other mechanisms of connecting to the core network 104 are also possible for the mobile device 110, such as over wired access networks, Wi-Fi networks (e.g., based on IEEE 802.11, etc.) and so on.

In the illustrated embodiment, the mobile device 110 may communicate with the APs 112(1)-112(N), which may be separate from the RAN 106. The APs 112(1)-112(N) can be connected to the Internet 102 independent of the core network 104. Each AP can have a geographic coverage area such that the mobile device 110 can communicate with an AP based on its location. For instance, the first AP 112(1) covers the first geographic area 118 and the second AP 112(N) covers the second geographic area 120. The coverage areas can differ in size and may overlap at least partially. The mobile device 110 can be covered by more than one AP (e.g., at a transition point or a coverage boundary) and can, therefore, associate with the APs 112(1)-112(N) at different times. The first AP 112(1) may support a first RF band 114 and the second AP 112(N) may support a second RF band 116. In various embodiments, one AP may support multiple bands.

The mobile device 110 may be a multi-band device that is configured to support a plurality of bands. For example, the mobile device 110 may be a quad-band GSM phone that uses GSM service in the 850-MHz, 900-MHz, 1800-MHz, or 1900-MHz band. Accordingly, the mobile device 110 may include an RF band connection framework for monitoring or controlling logic, circuits, etc., to perform scans for an RF band and establishing a connection with a wireless network. In various embodiments, the RF band connection framework determines the order in which bands are scanned by selectively prioritizing which bands to scan first when attempting to connect to the network 100. Thus, the order in which bands are scanned as determined by the RF band connection framework is generally different from the order in which bands are scanned by the default setting of the mobile device 110.

In the illustrated embodiment, the mobile device 110 may connect to the first AP 112(1) while in the first geographic area 118. Accordingly, the mobile device 110 may support the first RF band 114. Subsequently, the mobile device 110 may be triggered to scan for second RF band 116 when the mobile device 110 is moved to the second geographic area 120 from the first geographic area 118. For example, the mobile device 110 may be moved to the second geographic area 120 while the mobile device 110 is powered off. Similarly, the mobile device 110 may enter an airplane mode in the first geographic area 118 and be moved to the second geographic area, where the mobile device 110 is toggled off from the airplane mode.

When the mobile device 110 is powered on or toggled off from the airplane mode, the RF band connection framework of the mobile device 110 may attempt to reconnect to the network 100 using the first RF band 114 (i.e., the last used RF band). Upon determining that the first RF band 114 is not available or upon determining that the mobile device cannot connect to the first AP 112(1) using the first RF band 114, the RF band connection framework may trigger band scanning. For instance, the RF band connection framework receives the mobile device's geolocation coordinates (i.e., latitude and longitude) from the mobile device's 110 location services, such as a Global Positioning System (GPS) or an assisted GPS (A-GPS) service of the mobile device 110. The location services may monitor the real-time or near real-time location information of the mobile device 110. The RF band connection framework uses the geolocation coordinates to determine whether latitude and/or longitude of the geolocation coordinates are within a range of available bands supported by the mobile device 110 to connect to the network 100.

The RF band connection framework can identify one or more available bands based on location information or geolocation coordinates of the location of the mobile device 110 received from location services of the mobile device 110. The RF band connection framework can then compare the available bands to identify a band with acceptable signal quality. The available band with acceptable signal quality is identified as a preferred band and scanned first during the scanning process. If there are multiple available bands with acceptable signal quality, the RF band connection framework compares aggregate bandwidth to select a band with the most bandwidth. The available band with acceptable signal quality having the most bandwidth is more preferred over another available band having less bandwidth and therefore scanned first because a band with higher bandwidth can support more transmission modes. If the band with the most bandwidth is not supported by the wireless network, the band with the second most bandwidth is scanned second, and so on until the mobile device 110 selects a network cell to connect to the wireless network.

In another example, the scans may be triggered while the signal strength of the first RF band 114 is greater than the roaming threshold. In various embodiments, the mobile device 110 may begin to scan for a different RF band of the same wireless network or different wireless network (i.e., a home public land mobile network (HPLMN) or a visited public land mobile network (VPLMN)). In the illustrated embodiment, the second RF band 116 in the second geographic area 120 may be supported by the mobile device 110. Thus, if the second RF band 116 is available based on the mobile device's 110 location and has acceptable signal quality, the mobile device 110 may selectively prioritize scanning for the second RF band 116 and connect to the second AP 112(N) while in the second geographic area 120.

Example Computing Device Components

Figure 2:
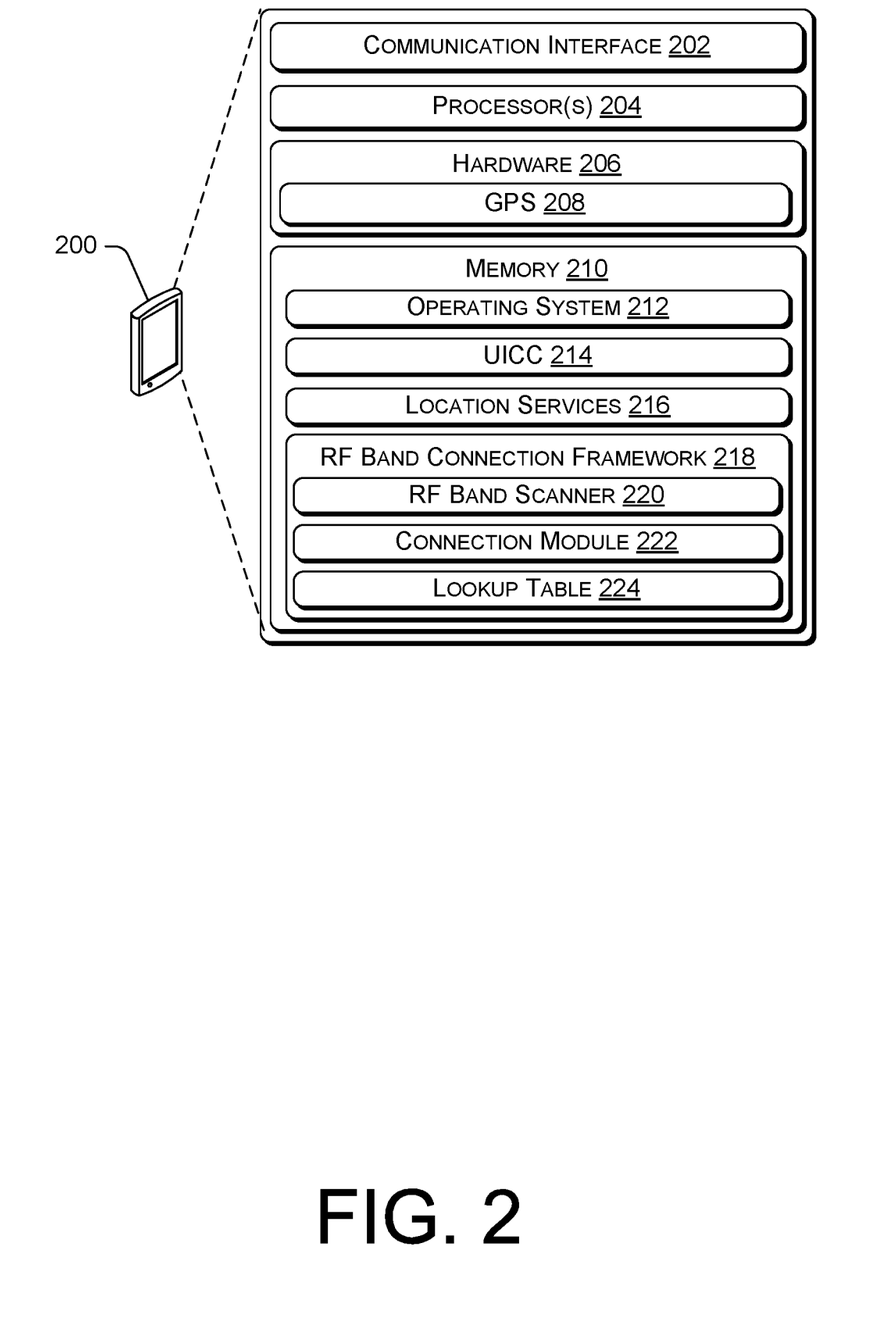
FIG. 2 is a block diagram showing various components of an illustrative computing device that can be used for establishing wireless communication using optimized band scanning.

FIG. 2 is a block diagram showing various components of an illustrative mobile device that performs optimized scanning for an RF band. It is noted that the mobile device 200 as described herein can operate with more or fewer of the components shown herein. Additionally, the mobile device 200 shown herein or portions thereof can serve as a representation of one or more of the mobile device 200 of the present system.

The mobile device 200 may include a communication interface 202, one or more processors 204, hardware 206, and memory 210. The communication interface 202 may include wireless and/or wired communication components that enable the mobile device 200 to transmit data to and receive data from other networked devices. For example, the communication interface 202 may include one or more antennas and a transceiver, among other components. In some embodiments, the antennas may include an uplink antenna that sends radio signals. In addition, there may be a downlink antenna that receives radio signals. In other embodiments, a single antenna may both send and receive radio signals. The signals may be processed by the transceiver that is configured to receive and transmit data. In some embodiments, a receiver and a transmitter may be implemented.

In at least one example, the one or more processor(s) 204 may be a central processing unit(s) (CPU), graphics processing unit(s) (GPU), both a CPU and GPU or any other sort of processing unit(s). Each of the one or more processor(s) 204 may have numerous arithmetic logic units (ALUs) that perform arithmetic and logical operations as well as one or more control units (CUs) that extract instructions and stored content from processor cache memory, and then executes these instructions by calling on the ALUs, as necessary during program execution.

The one or more processor(s) 204 may also be responsible for executing all computer applications stored in the memory, which can be associated with common types of volatile (RAM) and/or non-volatile (ROM) memory. The hardware 206 may include additional user interface, data communication, or data storage hardware. For example, the user interfaces may include a data output device (e.g., visual display, audio speakers), and one or more data input devices. The data input devices may include but are not limited to, combinations of one or more of keypads, keyboards, mouse devices, touch screens that accept gestures, microphones, voice or speech recognition devices, and any other suitable devices. Additionally, the hardware 206 may include one or more sensors such as GPS 208, which uses space-based satellites that provide positioning signals that are triangulated by a GPS receiver to determine a geophysical position of the mobile device 200.

The memory 210 may be implemented using computer-readable media, such as computer storage media. Computer-readable media includes, at least, two types of computer-readable media, namely computer storage media and communications media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. The memory 210 may also include a firewall. In some embodiments, the firewall may be implemented as hardware 206 in the mobile device 200.

The mobile device 200 further includes a UICC 214 (e.g., SIM card) that is issued by a mobile phone operator. The UICC 214 can be various types of UICC (e.g., embedded UICC (eUICC)). The UICC 214 can be used for identifying subscriber services, executing programs, storing subscriber data, and/or so forth. In the case of eUICC, the eUICC may receive updates and provisioning information over-the-air (OTA) from the telecommunications service provider.

The processors 204 and the memory 210 of the mobile device 200 may implement an operating system 212, the location services 216, and the RF band connection framework 218. The operating system 212 may include components that enable the mobile device 200 to receive and transmit data via various interfaces (e.g., user controls, a communication interface, and/or memory input/output devices), as well as process data using the processors 204 to generate output. The operating system 212 may include a presentation component that presents the output (e.g., display the data on an electronic display, store the data in memory, transmit the data to another electronic device, etc.). Additionally, the operating system 212 may include other components that perform various additional functions generally associated with an operating system.

The location services 216 and the RF band connection framework 218 may include routines, program instructions, objects, and/or data structures that perform particular tasks or implement particular abstract data types. For example, the location services 216 may include one or more instructions, which when executed by the processors 204, determine the real-time or near real-time geolocation coordinates of the mobile device 200 based at least on the location information from the GPS 208.

The RF band connection framework 218 includes an RF band scanner 220, a connection module 222, and a look up table 224. These individual components of the RF band connection framework 218 also include routines, program instructions, objects, and/or data structures that perform particular tasks or implement particular abstract data types. For instance, the RF band scanner 220 may include one or more instructions, which when executed by the processors 204, scan for service on RF bands supported by the mobile device. The RF band scanner 220 can scan for RF bands in an order of preference based at least on the location of the mobile device 200, the signal quality, and/or the signal strength of the available RF bands. The RF band scanner 220 may be configured to perform scanning until the mobile device 200 establishes a connection to a network. If the mobile device 200 does not establish the network connection using a more preferred RF band, the RF band scanner 220 may scan for remaining bands supported by the mobile device 200 in default order. The RF band scanner 220 can stop scanning for other RF bands once the mobile device 200 establishes the network connection in order to conserve power.

The connection module 222 may instruct the transceiver to connect to the wireless network using an available RF band that has acceptable signal quality. The connection module 222 may include a signal quality detector component to detect the signal quality based at least on transmissions using one or more RF bands that may include information indicative of Energy to Interference Ratio (EC/IO), Signal to Interference Plus Noise Ratio (SINR), Reference Signal Received Quality (RSRQ), Carrier to Interference Plus Noise Ratio (CINR), and/or so forth. Additionally, the connection module 222 may include a signal strength detector component to detect the signal strength based at least on transmissions using one or more RF bands that may include information indicative of Received Signal Strength Indicator (RSSI), Reference Signal Received Power (RSRP), and/or so forth.

The connection module 222 may determine whether the mobile device 200 is connected to the network. If the mobile device 200 is not connected to the network, the connection module 222 receives the geolocation coordinates of the mobile device 200 from the location services 216. The connection module 222 may also determine whether the mobile device 200 can connect to the last acquired network cell. The connection module 222 may also determine whether the mobile device 200 is roaming. The connection module 222 uses the geolocation coordinates to identify one or more available bands that are within the range of the latitude and/or longitude of the geolocation coordinates from the look up table 224. In various embodiments, the look up table 224 can include a field for a market location (e.g., city and state), range of latitude, range of longitude, available bands, bandwidth for the available bands, and/or so forth. Upon identifying the one or more available bands based at least on the geolocation coordinates, the connection module 222 determines, via the signal quality detector component, whether the signal quality of at least one of the available bands is above a predetermined threshold. If at least one of the available bands has a signal quality above the predetermined threshold, the connection module 222 identifies that the available band with an acceptable signal quality is a preferred band. In some aspects, the connection module 222 may also determine, via the signal strength detector component, whether at least one of the available bands has an acceptable signal strength. Thus, if at least one of the available bands has a signal strength above a predetermined threshold, the connection module 222 identifies that the available band with an acceptable signal strength is a preferred band.

If there is more than one available band with an acceptable signal quality above the predetermined threshold, the connection module 222 identifies an available band with the most bandwidth. The connection module 222 instructs the RF band scanner 220 to begin band scanning with the most bandwidth, or the most preferred band. If the mobile device 200 is unable to connect to the network using the most preferred band, the connection module 222 instructs the RF band scanner 220 to search for the band with the second most bandwidth. Thus, the RF band scanner 220 performs scanning in an order of preference to speed up the process of selecting a network cell. If the mobile device 200 is unable to connect to the network after the RF band scanner 220 performs scanning for all of the preferred bands, the RF band scanner 220 can resume scanning in default order.

Example Processes

Figure 3:
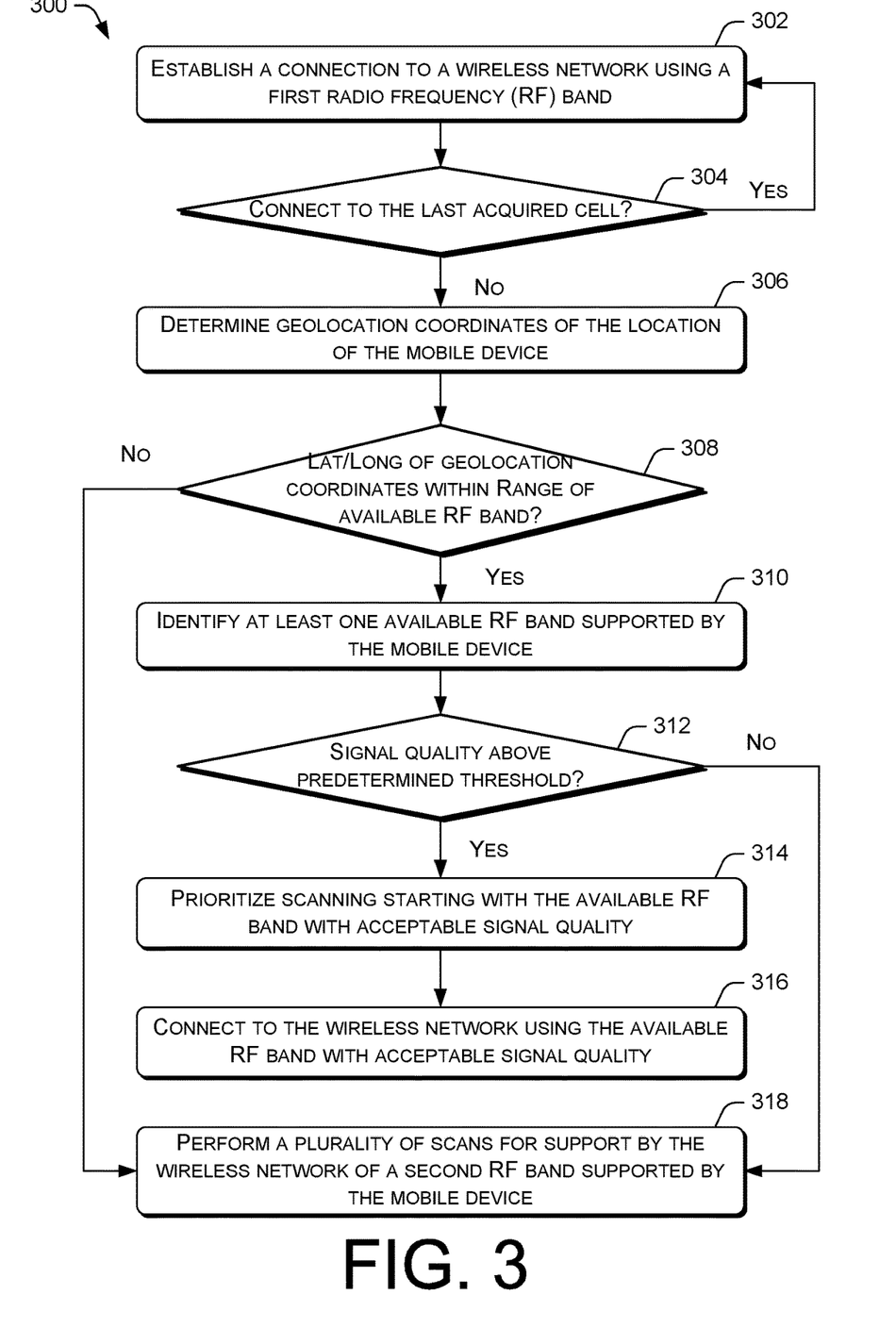
FIG. 3 is a flow diagram of an example process for scanning for a preferred band in a wireless network when a mobile device is powered on or when toggled off from an airplane mode, in accordance with various aspects of the present disclosure.
Figure 4:
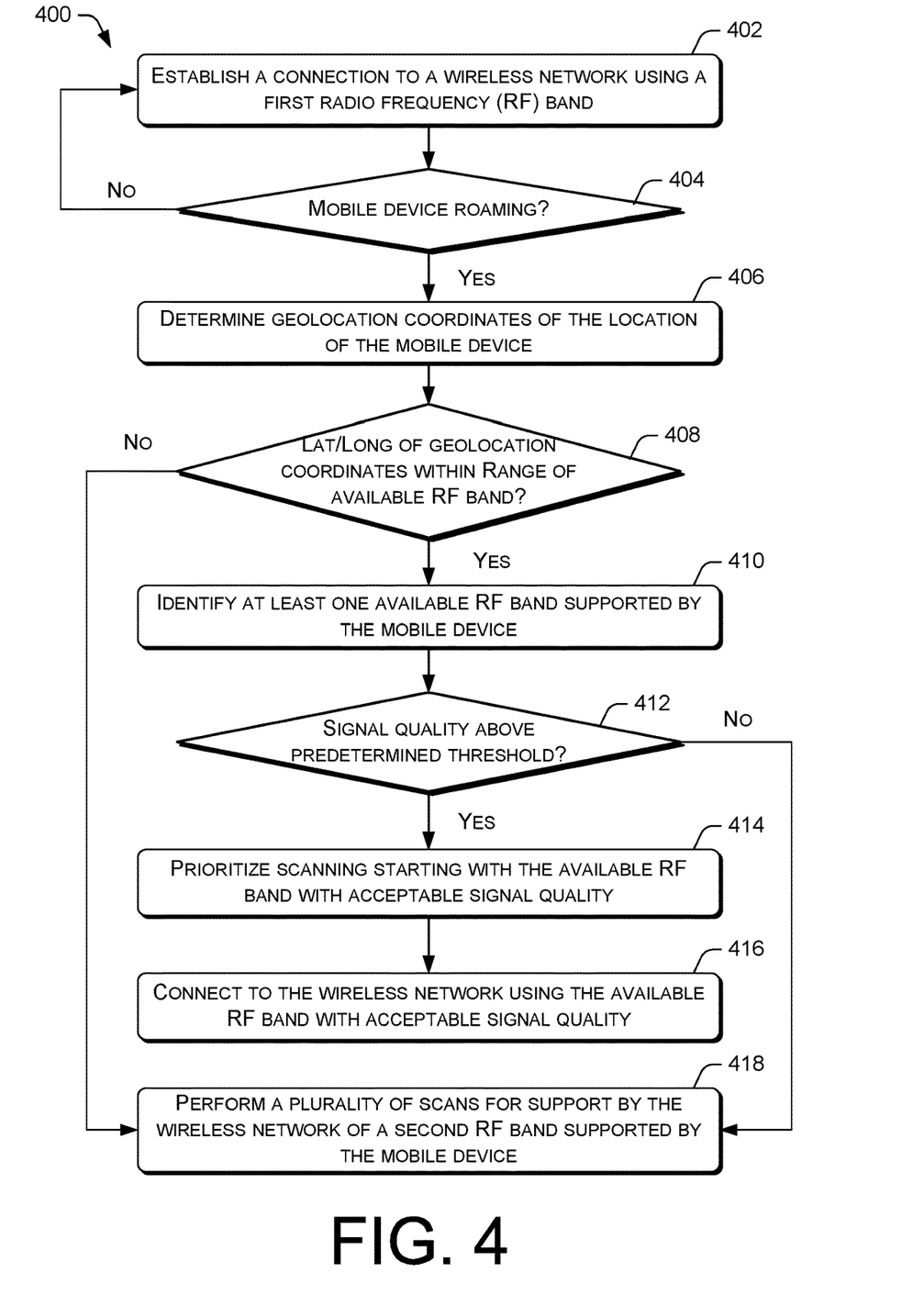
FIG. 4 is a flow diagram of an example process for scanning for a preferred band in a wireless network when a mobile device is roaming, in accordance with various aspects of the present disclosure.
Figure 5:
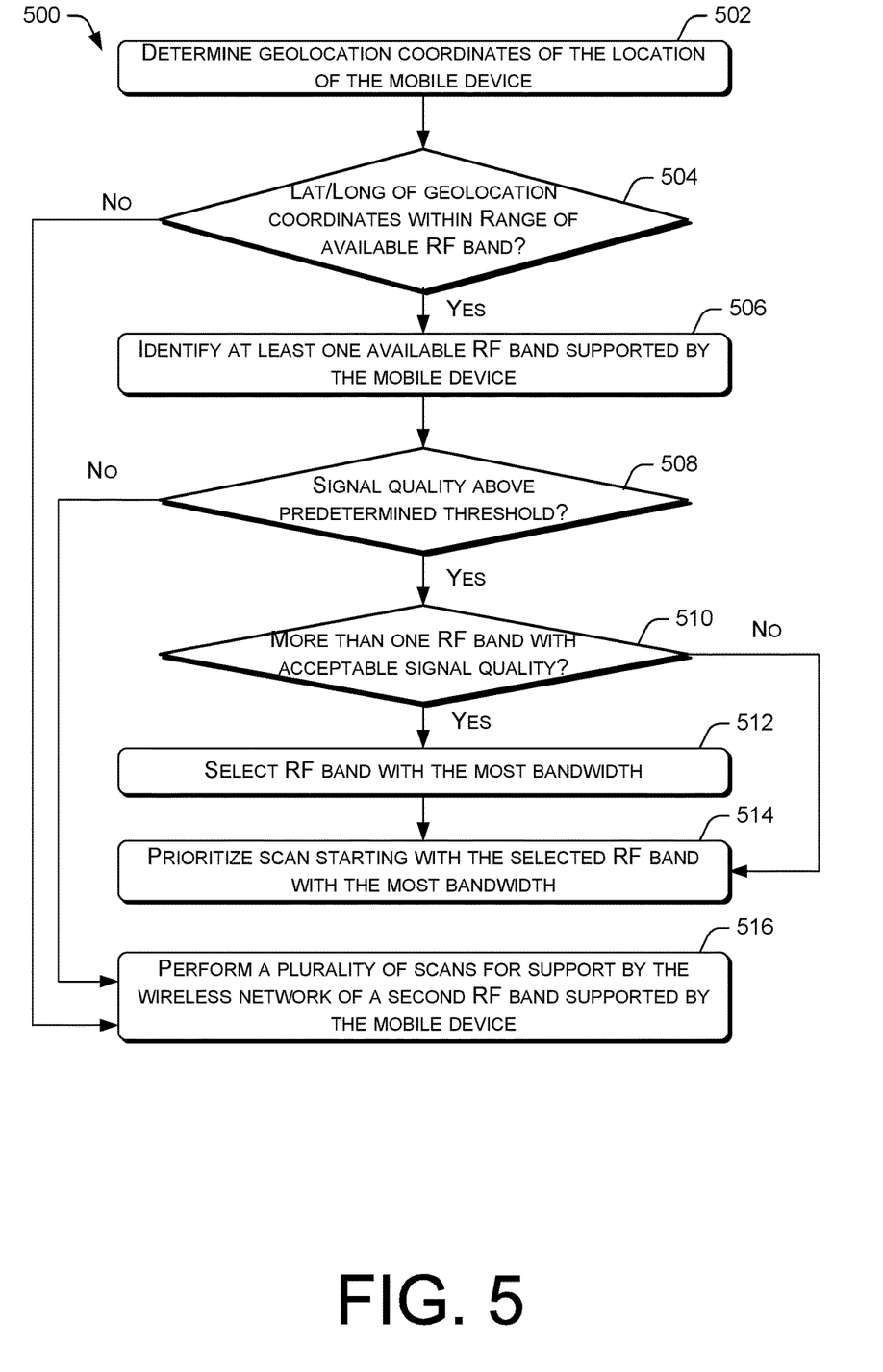
FIG. 5 is a flow diagram of an example process for selecting a preferred band to scan from a plurality of available bands.

FIGS. 3-5 present illustrative processes 300-500 for optimizing band scanning at a mobile device. The processes 300-500 are illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 300-500 are described with reference to the wireless communication network 100 of FIG. 1.

FIG. 3 is a flow diagram of an example process 300 for scanning for an available band in a wireless network when a mobile device is powered on or when toggled off from an airplane mode, in accordance with various aspects of the present disclosure. At block 302, the connection module of the RF band connection framework establishes a connection to a wireless network using a first RF band. Subsequently, the mobile device may switch off and then back on or toggle off from an airplane mode. In some aspects, the location services of the mobile device determine whether the device has been carried to a new location upon powering on or being toggled off from an airplane mode. At decision block 304, the connection module may determine whether the mobile device can connect to the last acquired network cell using the first RF band (i.e., the last used band).

If the device can connect to the last acquired network cell ("yes" response from the decision block 304), the connection module re-connects to the wireless network using the first RF band, as indicated in block 302. Conversely, if the connection module is unable to connect to the last acquired network cell ("no" response from the decision block 304), the location services of the mobile device determine the geolocation coordinates (i.e., latitude and longitude) of the location of the mobile device, as indicated in block 306. At decision block 308, the connection module determines whether the latitude and/or longitude of the geolocation coordinates are within a range of at least one available RF band. If the geolocation coordinates are not within a range of at least one available RF band ("no" response from the decision block 308), the RF band scanner performs a plurality of scans for support by the wireless network of a second RF band supported by the mobile device, as indicated in block 318. The scanning is performed in accordance with a default setting of the mobile device. For example, bands that are supported by the mobile device may be scanned in a predetermined order.

If the latitude and/or longitude of the geolocation coordinates are within a range of at least one available RF band ("yes" response from the decision block 308), the connection module identifies at least one available RF band supported by the mobile device, as indicated in block 310. At decision block 312, the connection module determines whether the signal quality of the available RF band is above a predetermined threshold. If the signal quality of the available band is above the predetermined threshold ("yes" response from the decision block 312), the RF band scanner selectively prioritizes band scanning starting with the available RF band having acceptable signal quality, as indicated in block 314. At block 316, the connection module connects to the wireless network using the available RF band with acceptable signal quality. If the signal quality of the available band is not above the predetermined threshold ("no" response from the decision block 312), the RF band scanner performs a plurality of scans for support by the wireless network of a second RF band supported by the mobile device, as indicated in block 318.

FIG. 4 is a flow diagram of an example process 400 for scanning for an available band in a wireless network when a mobile device is roaming, in accordance with various aspects of the present disclosure. At block 402, the mobile device establishes a connection with a wireless network using a first RF band. At decision block 404, the mobile device determines whether it is roaming. In one example, the mobile device may determine that it is roaming when the signal strength of the first RF band is greater than the roaming threshold.

If the mobile device is not roaming ("no" response from the decision block 404), the connection module re-connects to the wireless network using the first RF band, as indicated in block 402. Conversely, if the mobile device is roaming ("yes" response from the decision block 404), the location services of the mobile device determine the geolocation coordinates (i.e., latitude and longitude) of the location of the mobile device, as indicated in block 406. At decision block 408, the connection module determines whether the latitude and/or longitude of the geolocation coordinates are within a range of at least one available RF band. If the geolocation coordinates are not within a range of at least one available RF band ("no" response from the decision block 408), the RF band scanner performs a plurality of scans for support by the wireless network of a second RF band supported by the mobile device, as indicated in block 418. The scanning is performed in accordance with a default setting of the mobile device. For example, bands that are supported by the mobile device may be scanned in a predetermined order. If the latitude and/or longitude of the geolocation coordinates are within a range of at least one available RF band ("yes" response from the decision block 408), the connection module identifies at least one available RF band supported by the mobile device, as indicated in block 410. At decision block 412, the connection module determines whether the signal quality of the available RF band is above a predetermined threshold. If the signal quality of the available band is above the predetermined threshold ("yes" response from the decision block 412), the RF band scanner selectively prioritizes band scanning starting with the available RF band having acceptable signal quality, as indicated in block 414. At block 416, the connection module connects to the wireless network using the available RF band with acceptable signal quality. If the signal quality of the available band is not above the predetermined threshold ("no" response from the decision block 412), the RF band scanner performs a plurality of scans for support by the wireless network of a second RF band supported by the mobile device, as indicated in block 418.

FIG. 5 is a flow diagram of an example process 500 for selecting a preferred band to scan from a plurality of available bands. At block 502, the location services of the mobile device determine the geolocation coordinates (i.e., latitude and longitude) of the location of the mobile device. At decision block 504, the connection module of the RF band connection framework determines whether the latitude and/or longitude of the geolocation coordinates are within a range of at least one available RF band. If the geolocation coordinates are not within a range of at least one available RF band ("no" response from the decision block 504), the RF band scanner of the RF band connection framework performs a plurality of scans for support by the wireless network of a second RF band supported by the mobile device, as indicated in block 516. The scanning is performed in accordance with a default setting. For example, bands that are supported by the mobile device may be scanned in a predetermined order.

If the latitude and/or longitude of the geolocation coordinates are within a range of at least one available RF band ("yes" response from the decision block 504), the connection module identifies at least one available RF band supported by the mobile device, as indicated in block 506. At decision block 508, the connection module determines whether the signal quality of the at least one available RF band is above a predetermined threshold. If the signal quality of the at least one available RF band is not above the predetermined threshold ("no" response from the decision block 508), the RF band scanner of the RF band connection framework performs a plurality of scans for support by the wireless network of a second RF band supported by the mobile device, as indicated in block 516.

If the signal quality of the at least one available RF band is above the predetermined threshold ("yes" response from the decision block 508), the connection module determines whether there is more than one available RF band with acceptable signal quality, as indicated in decision block 510. If there is only one available RF band with an acceptable signal quality ("no" response from the decision block 510), the RF band scanner selectively prioritizes band scanning starting with the available RF band having acceptable signal quality, as indicated in block 514. If there is more than one available RF band with an acceptable signal quality ("yes" response from the decision block 510), the connection module selects an RF band with the most aggregate bandwidth, as indicated in block 512. For example, the connection module may select the 5 GHz band if the 5 GHz band and the 2.4 GHz band are both available and have acceptable signal quality because the 5 GHz band may provide higher bandwidth and support for more transmission modes than the 2.4 GHz. If the mobile device fails to make a connection after performing scans for support by the wireless network of the 5 GHz band, the RF band scanner may scan for an available band with the second highest bandwidth having an acceptable signal quality (e.g., 2.4 GHz) and so on until the mobile device connects to the network.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that upon execution cause one or more processors to perform acts comprising:
   determining geolocation coordinates corresponding to a real-time location of a mobile device;
   identifying at least one available radio frequency (RF) band of a plurality of RF bands supported by the mobile device based at least on the geolocation coordinates;
   determining whether a signal quality of the at least one available RF band is above a predetermined threshold;
   identifying the at least one available RF band as a preferred band and storing identification information of the at least one available RF band in the mobile device in response to determining that the signal quality of the at least one available RF band is above the predetermined threshold;
   prioritizing a scan for support by a wireless network of the preferred band; and
   connecting to the wireless network using the preferred band based on the identification information.

2. The one or more non-transitory computer-readable media of claim 1, wherein the acts further comprise:
   determining an aggregate bandwidth of a first RF band and a second RF band of the at least one available RF band; and
   selectively prioritizing scanning for support by the wireless network of the first RF band if the aggregate bandwidth of the first RF band is greater than the aggregate bandwidth of the second RF band.

3. The one or more non-transitory computer-readable media of claim 2, wherein the acts further comprise:
   determining whether the mobile device is connected to the wireless network using the first RF band; and
   selectively prioritizing scanning for support by the wireless network of the second RF band if the mobile device is not connected to the wireless network using the first RF band.

4. The one or more non-transitory computer-readable media of claim 1, wherein the acts further comprise:
   determining whether a signal strength of the at least one available RF band is above an additional predetermined threshold;
   performing an additional scan for support by the wireless network of the at least one available RF band in response to determining that the signal quality of the at least one available RF band is above the additional predetermined threshold; and
   connecting to the wireless network using the at least one available RF band.

5. The one or more non-transitory computer-readable media of claim 1, wherein the wireless network comprises a home public land mobile network (HPLMN) or a visited public land mobile network (VPLMN).

6. The one or more non-transitory computer-readable media of claim 5, wherein the acts further comprise:
   triggering the scan when the mobile device is connected to the VPLMN.

7. The one or more non-transitory computer-readable media of claim 1, wherein the at least one available RF band comprises a last used RF band.

8. A computer-implemented method, comprising:
   determining geolocation coordinates corresponding to a real-time location of a mobile device;

identifying at least one available radio frequency (RF) band of a plurality of RF bands supported by the mobile device based at least on the geolocation coordinates;

determining whether a signal quality of the at least one available RF band is above a predetermined threshold;

identifying the at least one available RF band as a preferred band and storing identification information of the at least one available RF band in the mobile device in response to determining that the signal quality of the at least one available RF band is above the predetermined threshold;

prioritizing a scan for support by a wireless network of the preferred band and connecting to the wireless network using the preferred band based on the identification information.

9. The computer-implemented method of claim 8, further comprising:

determining an aggregate bandwidth of a first RF band and a second RF band of the at least one available RF band; and selectively prioritizing scanning for support by the wireless network of the first RF band if the aggregate bandwidth of the first RF band is greater than the aggregate bandwidth of the second RF band.

10. The computer-implemented method of claim 9, further comprising:

determining whether the mobile device is connected to the wireless network using the first RF band; and selectively prioritizing scanning for support by the wireless network of the second RF band if the mobile device is not connected to the wireless network using the first RF band.

11. The computer-implemented method of claim 8, further comprising:

determining whether a signal strength of the at least one available RF band is above an additional predetermined threshold;

performing an additional scan for support by the wireless network of the at least one available RF band in response to determining that the signal quality of the at least one available RF band is above the additional predetermined threshold; and connecting to the wireless network using the at least one available RF band.

12. The computer-implemented method of claim 8, wherein the wireless network comprises a home public land mobile network (HPLMN) or a visited public land mobile network (VPLMN).

13. The computer-implemented method of claim 8, wherein the at least one available RF band comprises a last used RF band.

14. The computer-implemented method of claim 13, further comprising:

triggering the scan when the mobile device is not connected to the wireless network using the last used RF band.

15. A system, comprising:

one or more non-transitory storage mediums configured to provide stored computer-readable instructions, the one or more non-transitory storage mediums coupled to one or more processors, the one or more processors configured to execute the computer-readable instructions to cause the one or more processors to:

determine geolocation coordinates corresponding to a real-time location of a mobile device;

identify at least one available radio frequency (RF) band of a plurality of RF bands supported by the mobile device based at least on the geolocation coordinates;

determine whether a signal quality of the at least one available RF band is above a predetermined threshold;

identifying the at least one available RF band as a preferred band and storing identification information of the at least one available RF band in the mobile device in response to determining that the signal quality of the at least one available RF band is above the predetermined threshold;

prioritize a scan for support by a wireless network of the preferred band; and connect to the wireless network using the preferred band based on the identification information.

16. The system of claim 15, wherein the one or more processors are further configured to:

determine an aggregate bandwidth of a first RF band and a second RF band of the at least one available RF band; and selectively prioritize scanning for support by the wireless network of the first RF band if the aggregate bandwidth of the first RF band is greater than the aggregate bandwidth of the second RF band.

17. The system of claim 16, wherein the one or more processors are further configured to:

determine whether the mobile device is connected to the wireless network using the first RF band; and selectively prioritize scanning for support by the wireless network of the second RF band if the mobile device is not connected to the wireless network using the first RF band.

18. The system of claim 15, wherein the one or more processors are further configured to:

determine whether a signal strength of the at least one available RF band is above an additional predetermined threshold;

perform an additional scan for support by the wireless network of the at least one available RF band in response to determining that the signal quality of the at least one available RF band is above the additional predetermined threshold; and connect to the wireless network using the at least one available RF band.

19. The system of claim 15, wherein the wireless network comprises a home public land mobile network (HPLMN) or a visited public land mobile network (VPLMN).

20. The system of claim 15, triggering the scan when the mobile device is not connected to a last acquired network cell of the wireless network.

* * * * *